United States Patent [19]
Iihoshi et al.

[11] Patent Number: 6,032,097
[45] Date of Patent: Feb. 29, 2000

[54] VEHICLE PLATOON CONTROL SYSTEM

[75] Inventors: Akira Iihoshi; Sachio Kobayashi; Yoshimi Furukawa, all of Wako, Japan

[73] Assignee: Honda Giken Kogyo Kabushiki Kaisha, Tokyo, Japan

[21] Appl. No.: 08/978,166

[22] Filed: Nov. 26, 1997

[30] Foreign Application Priority Data

Nov. 27, 1996 [JP] Japan ................................. 8-316770

[51] Int. Cl.$^7$ ................................................. G06F 7/00
[52] U.S. Cl. ........................ 701/96; 701/23; 340/435; 340/436; 340/988; 180/168
[58] Field of Search ........................ 701/96, 23, 117, 701/119; 180/168; 340/435, 436, 902, 904, 907, 988, 903

[56] References Cited

U.S. PATENT DOCUMENTS

| | | |
|---|---|---|
| 5,369,591 | 11/1994 | Broxmeyer . |
| 5,420,794 | 5/1995 | James . |
| 5,680,122 | 10/1997 | Mio ........................................ 340/932 |
| 5,777,451 | 7/1998 | Kobayashi et al. ...................... 701/23 |
| 5,780,119 | 7/1998 | Yamashita et al. ..................... 340/903 |

OTHER PUBLICATIONS

TASC Publication Obtained from Internet; Title: Opportunities for Intelligent Vehicle Highway Systems, Date: 1996.

*Primary Examiner*—William A. Cuchlinski, Jr.
*Assistant Examiner*—Gertrude Arthur
*Attorney, Agent, or Firm*—Lyon & Lyon LLP

[57] ABSTRACT

A target motor vehicle is established for a platoon of motor vehicles running on a road, and motion information of the target motor vehicle is transmitted to the motor vehicles which follow the target motor vehicle through intervehicular communications. Each of the following motor vehicles controls itself to run in platoon based on the transmitted motion information.

6 Claims, 9 Drawing Sheets

VEHICLE PLATOON CONTROL SYSTEM

BACKGROUND OF THE INVENTION

1. Field of the Invention

The present invention relates to a vehicle platoon control system for controlling a platoon of motor vehicles running on a road, and more particularly to a vehicle platoon control system for controlling a platoon of motor vehicles automatically in a lane on a road based on positional information from the road.

2. Description of the Prior Art

Research and development efforts are being made to develop a technology for automatically driving motor vehicles such as automobiles on roads while detecting obstacles with a radar, a CCD camera, or their combination to recognize front obstacles and forward traffic conditions.

It has already been practiced to control vehicles to automatically run under certain conditions in factories or the like. Such an automatically running vehicle travels along a predetermined path at a constant low speed while detecting magnetic or optical markers positioned at spaced intervals along the path. For example, the automatically running vehicle travels at a very low speed of about 10 km/h.

Various automatic vehicle control systems have been studied in order to reduce traffic jams and accidents on freeways and also to lessen driver's fatigue.

Particularly, an automatic platoon vehicle control system for controlling a platoon of motor vehicles to automatically travel on a road has been drawing much attention in the art.

The principles of the system for controlling automatically running vehicles in factories may be incorporated as basic principles of such an automatic platoon vehicle control system.

However, the system for controlling automatically running vehicles in factories is basically designed to control them to run at a very low speed, and does not lend itself to controlling general motor vehicles, such as automobiles, to run at high speeds ranging from 60 km/h to 100 km/h.

Controlling a platoon of motor vehicles to run automatically needs a special control process because the distances between the motor vehicles would be disturbed unless controlled by such a special control process. Without such a special control process, the spacing of motor vehicles near the rear end of the platoon could not be maintained with high accuracy due to an accumulation of control delays. It is highly critical to solve this problem in the control of a platoon of motor vehicles which are traveling at high speeds on a road.

SUMMARY OF THE INVENTION

It is therefore an object of the present invention to provide a vehicle platoon control system which is capable of stably controlling a platoon of motor vehicles and particularly smoothly controlling the speeds of the motor vehicles on a road under given conditions, especially, a road for automatically driven or autonomous motor vehicles, with magnetic information sources (markers) or the like arranged at spaced intervals along paths in lanes on the road.

According to the present invention, there is provided a vehicle platoon control system for controlling a platoon of motor vehicles, comprising means for establishing a target motor vehicle for leading the platoon of motor vehicles, means for transmitting motion information including a position and a speed of the target motor vehicle to the motor vehicles which follow the target motor vehicle, and means on each of the following motor vehicles for controlling its own following motor vehicle to run in platoon based on the transmitted motion information.

With the above arrangement, a target motor vehicle for leading the platoon of motor vehicles is established by a leading motor vehicle of the platoon, i.e., a platoon leader, and motion information of the target motor vehicle is transmitted to the following motor vehicles through intervehicular communications, and each of the following motor vehicles controls itself to run in platoon based on the transmitted motion information. The vehicle platoon control system is effective to prevent intervehicular distances between the motor vehicles of the platoon from being oscillated, i.e., locally disturbed, and also to improve controllability of motor vehicles near the rear end of the platoon.

The means for establishing comprises means for establishing a leading motor vehicle of the platoon as the target motor vehicle, and the means on each of the following motor vehicles comprises means for determining a target intervehicular distance from the target motor vehicle based on the motion information of the target motor vehicle and a position of its own following motor vehicle relative to the target motor vehicle, and controlling its own following motor vehicle to run based on the target intervehicular distance. The motor vehicles can continuously be controlled to run in platoon even when another vehicle cuts in, the platoon is broken up, or other motor vehicles join the platoon.

According to the present invention, there is also provided a vehicle platoon control system for controlling a platoon of motor vehicles, comprising means for establishing a hypothetical target motor vehicle for a leading motor vehicle of the platoon to follow, means for transmitting motion information of the hypothetical target motor vehicle to the motor vehicles which follow the hypothetical target motor vehicle, and means on each of the following motor vehicles for controlling its own following motor vehicle to run in platoon based on the transmitted motion information.

With this arrangement, a hypothetical target motor vehicle for a leading motor vehicle of the platoon to follow is established, and motion information of the hypothetical target motor vehicle is transmitted to the motor vehicles which follow the hypothetical target motor vehicle through intervehicular communications. The vehicle platoon control system allows a platoon leader and a following motor vehicle of the platoon to switch around without any substantial system program modification, and can establish a hypothetical motor vehicle and transmit motion information of the hypothetical motor vehicle to following motor vehicles to continuously control the motor vehicles to run in platoon.

The means on each of the following motor vehicles comprises means for detecting the position of its own following motor vehicle as counted from the target motor vehicle. The following motor vehicles can thus recognize their positions in the platoon relative to the target motor vehicle. The vehicle platoon control system does not require the positions of the following motor vehicles to be determined in advance, but continuously controls the motor vehicles to run in platoon even when another vehicle cuts in, changing the positions of the motor vehicles in the platoon.

The means on each of the following motor vehicles comprises a first control loop for controlling its own following motor vehicle to follow the target motor vehicle, and a second control loop having a gain which is nonlinearly variable with respect to the intervehicular distance between its own following motor vehicle and a preceding motor vehicle. For example, the gain of the second control loop exponentially increases to exponentially increase the intervehicular distance as the intervehicular distance approaches a predetermined minimum intervehicular distance.

Even when a motor vehicle drops out of the platoon, the vehicle platoon control system does not stop controlling the other motor vehicles to run in platoon, and when the motor vehicle that has dropped out returns to the platoon, the vehicle platoon control system can continuously control the motor vehicles to run in platoon.

The means on each of the following motor vehicles comprises means for transmitting a target intervehicular distance from the target motor vehicle and a length of its own following motor vehicle to a following motor vehicle through intervehicular communications, and wherein the last-mentioned following motor vehicle has means for determining a target intervehicular distance for its own following motor vehicle based on the target intervehicular distance and the length which have been transmitted, and controlling its own following motor vehicle to run based on the determined target intervehicular distance.

Each of the following motor vehicles transmits a target intervehicular distance from the target motor vehicle and a length of its own following motor vehicle to a following motor vehicle, and the last-mentioned following motor vehicle determines a target intervehicular distance for its own following motor vehicle based on the target intervehicular distance and the length which have been transmitted, and controls its own following motor vehicle to run based on the determined target intervehicular distance.

The vehicle platoon control system thus allows different types of motor vehicles, such as trucks of different lengths, smaller automobiles, larger automobiles, etc., to be mixed in a platoon, and can control those motor vehicles to run in platoon.

According to the present invention, there is further provided a vehicle platoon control system for controlling a platoon of motor vehicles, comprising means for establishing a leading motor vehicle of the platoon as a target motor vehicle for leading the platoon of motor vehicles, means for transmitting motion information of the target motor vehicle to the motor vehicles which follow the target motor vehicle, and means on each of the following motor vehicles for controlling its own following motor vehicle to run in platoon based on the transmitted motion information. The means on each of the following motor vehicles comprises means for determining a target intervehicular distance from the target motor vehicle based on the motion information of the target motor vehicle and a position of its own following motor vehicle relative to the target motor vehicle, and controlling its own following motor vehicle to run based on the target intervehicular distance. The means on each of the following motor vehicles comprises means for detecting the position of its own following motor vehicle as counted from the target motor vehicle.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 2:
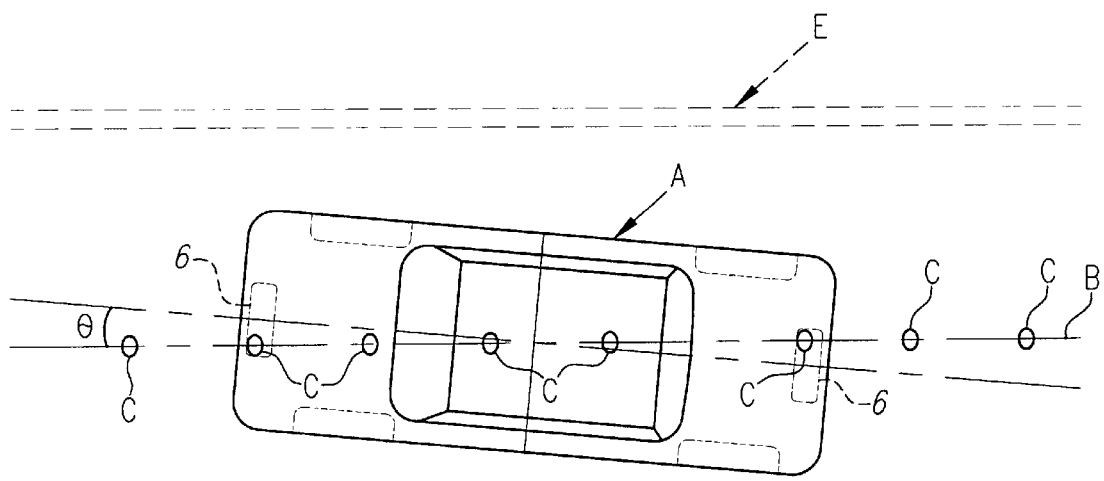
FIG. 2 is a schematic view illustrative of the manner in which each of the automatically driven motor vehicles shown in FIG. 1 magnetically senses magnetic information sources.

As shown in FIG. 2, an automatically driven motor vehicle A which is controlled by a platoon vehicle control system according to the present invention automatically runs along a running path B at the center of an automatic running road while detecting magnetic information sources (magnetic nails or markers) C which are embedded in the road at given intervals ranging from 100 m to 1000 m, for example.

If there is another motor vehicle (not shown in FIG. 2) running forward of the motor vehicle A, i.e., if the motor vehicle A is following another motor vehicle, then the motor vehicle A keeps a given intervehicular distance between itself and the front motor vehicle while running behind the front motor vehicle.

A leakage coaxial cable (LCX cable) E is installed as an information providing facility on and along the road for transmitting information to and receiving information from the motor vehicle A.

Furthermore, information representing running conditions of front and following motor vehicles is also transmitted between these front and following motor vehicles.

Figure 1:
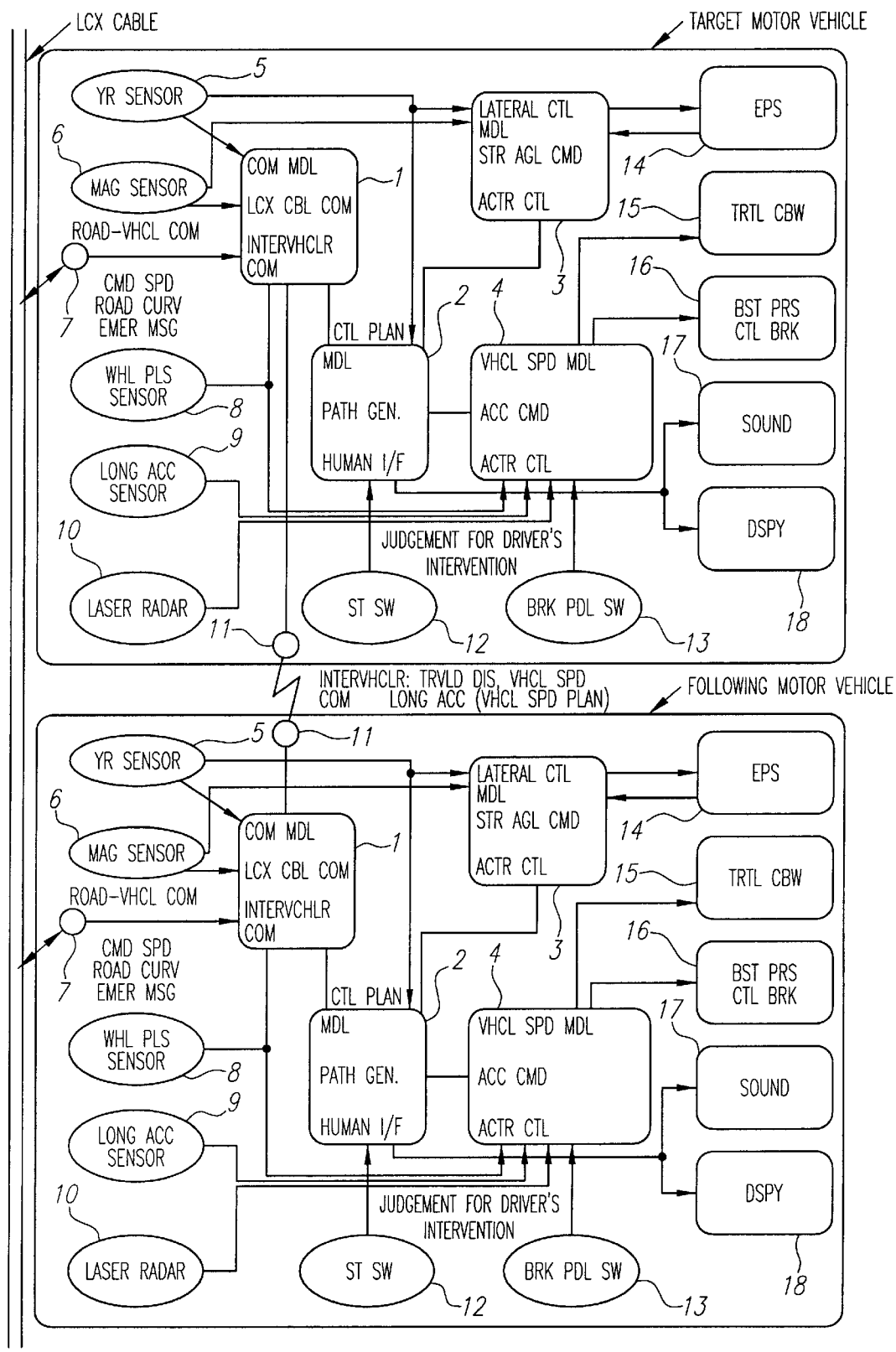
FIG. 1 is a block diagram of a system arrangement of each of automatically driven motor vehicles in a vehicle platoon control system according to the present invention.

The vehicle platoon control system for controlling such automatically driven motor vehicles is shown in FIG. 1.

FIG. 1 shows a system arrangement of two automatically driven motor vehicles, one running forward of the other along a predetermined path. The motor vehicle running forward of the other motor vehicle is also referred to as a target motor vehicle, and the other motor vehicle as a following motor vehicle.

As shown in FIG. 1, each of the automatically driven motor vehicles has a communication module 1, a control plan module 2, a lateral (steering) control module 3, and a vehicle speed control module 4. Each of these modules comprises a central processing unit (CPU).

Each of the motor vehicles also has a yaw rate sensor 5 for detecting an angular velocity of the motor vehicle in a lateral or steering direction thereof, two magnetic sensors (marker sensors) 6 for detecting the magnetic information sources C, a wheel pulse sensor 8 for outputting a pulse each time the wheels of the motor vehicle make one revolution, i.e., per distance traversed by the motor vehicle when the wheels make one revolution, a longitudinal acceleration sensor 9 for detecting an acceleration of the motor vehicle in a longitudinal direction thereof, and a laser radar 10 for detecting a front motor vehicle or a front obstacle and also detecting the distance up to such a front motor vehicle or a front obstacle. Data detected by the yaw rate sensor 5, the magnetic sensors 6, the wheel pulse sensor 8, the longitudinal acceleration sensor 9, and the laser radar 10 are supplied to the modules 1–4.

As shown in FIG. 2, the magnetic sensors 6 are disposed respectively beneath front and rear bumpers of the motor vehicle. Each of the magnetic sensors 6 detects not only the magnetic information source C positioned therebelow, but also the lateral position of the magnetic sensor 6, i.e., its position in lateral directions of the motor vehicle, with respect to the magnetic information source C within a range of about 45 cm on each lateral side of the center of the magnetic information source C, as the lateral position of one of the front and rear ends of the motor vehicle with respect to the magnetic information source C.

When supplied with detected data from the sensors 5, 6, 8, 9 and the laser radar 10, the modules 1–4 operate as follows:

The communication module 1 functions as a communication means for effecting road-vehicle communications with the LCX cable E and also intervehicular communications with the other motor vehicle through communication devices 7, 11 on its own motor vehicle which each comprise an antenna and a transmitter/receiver.

According to the road-vehicle communications, the communication module 1 receives from the LCX cable D various items of information including information as to a speed command for the motor vehicle in an area in which it is running, information as to the curvature of the road lying ahead of the motor vehicle, information as to traffic jams, and information as to emergency messages. The communication module 1 supplies the received items of information to the control plan module 2. The communication module 1 transmits the ID number of its own motor vehicle to the LCX cable E. Based on the received ID number, a central control system connected to the LCX cable E can recognize the present position where the motor vehicle is running.

According to the intervehicular communications, the communication module 1 transmits to and receives from the other motor vehicle, various items of information including information as to the position where the motor vehicle is running, i.e., the distance which the motor vehicle has traveled, on the running path B from time to time, which position or distance is recognized in a manner described later on, information as to the speed of the motor vehicle, information as to the longitudinal acceleration of the motor vehicle, and information as to a speed plan of the motor vehicle. The communication module 1 supplies the received items of information to the control plan module 2.

The communication module 1 also serves as a running position recognizing means for recognizing the position where the motor vehicle is running on the running path B.

According to this embodiment, the position where the motor vehicle is running is recognized as follows: Since the automatically driven motor vehicle basically runs on the running path B on which the magnetic information sources C are arrayed, the distance that the motor vehicle has traveled on the running path B represents the position where the motor vehicle runs on the running path B.

After the motor vehicle has started to run on the running path B, the communication module 1 counts the number of times that the magnetic information sources C are detected by the magnetic sensors 6, multiplies the counted number of times by the constant distance between the magnetic information sources C to determine a distance, and recognizes the determined distance as the distance that the motor vehicle has traveled on the running path B.

If the motor vehicle deviates from the running path B, failing to detect the magnetic information sources C, then the communication module 1 recognizes the distance that the motor vehicle has traveled on the running path B, based on an output signal from the wheel pulse sensor 8.

Based on the recognized distance, the communication module 1 recognizes the position where the motor vehicle is running on map data, which are carried by the motor vehicle, of the running path B, and gives the recognized position to the control plan module 2. The map data of the running path B are represented as data of the array of magnetic information sources C, and may be stored in a storage medium that is carried on the motor vehicle or may be received from an external source in every given running zone through communications with the LCX cable E or the like.

In this embodiment, the magnetic information sources C on the running rod B contain bit information whose magnetic polarity is reversed at intervals of 500 m, for example. Each time the bit information is detected by the magnetic sensors 6, the distance which the motor vehicle has traveled is corrected according to the intervals of 500 m, e.g., it is corrected into an integral multiple of 500 m.

An automatic driving start switch 12 is connected to the control plan module 2. When the automatic driving start switch 12 is turned on, the control plan module 2 starts generating information for automatically driving the motor vehicle.

Figure 4A:
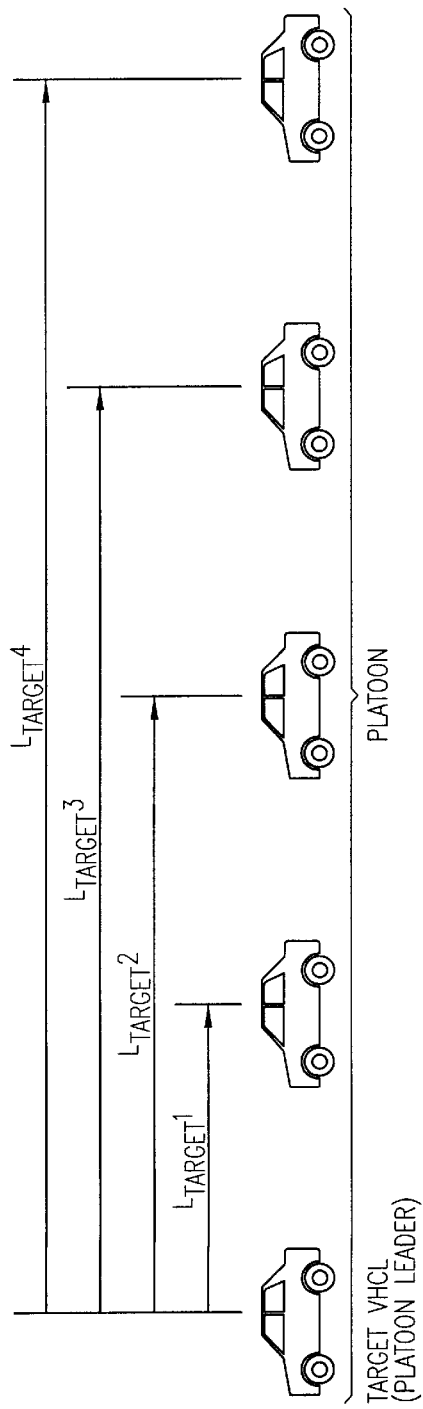
FIG. 4(a) is a diagram showing intervehicular distances and following positions from a target motor vehicle in a platoon of automatically driven motor vehicles.

FIG. 4(a) shows a platoon of automatically driven motor vehicles each having the system arrangement shown in FIG. 1. With the automatic driving start switch 12 turned on, the motor vehicles of the platoon establishes a target motor vehicle which will be used as a reference for running in platoon. In FIG. 4(a), the leading motor vehicle of the platoon is established as the target motor vehicle by the motor vehicles of the platoon. The target motor vehicle may be established before the motor vehicle start running in platoon.

Figure 4B:
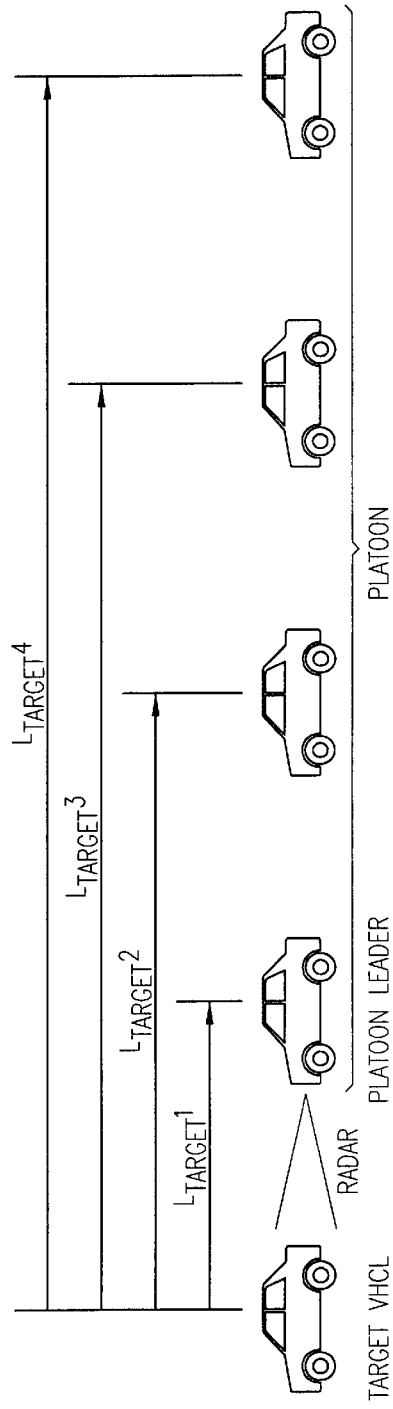
FIG. 4(b) is a diagram showing intervehicular distances and following positions from a target motor vehicle ahead of a platoon of automatically driven motor vehicles.

FIG. 4(b) shows another platoon of automatically driven motor vehicles each having the system arrangement shown in FIG. 1. In FIG. 4(b), the first motor vehicle of the platoon detects a preceding motor vehicle with the information from the radar or the CCD camera on the leading motor vehicle or platoon leader, and automatically establishes the detected preceding motor vehicle as a new target motor vehicle. By successively changing new target motor vehicles in this manner, new motor vehicles may automatically be added to the platoon. Even if a motor vehicle is incapable of communication between motor vehicles, that motor vehicle may be established as a target motor vehicle according to an algorithm described later on.

Figure 5:
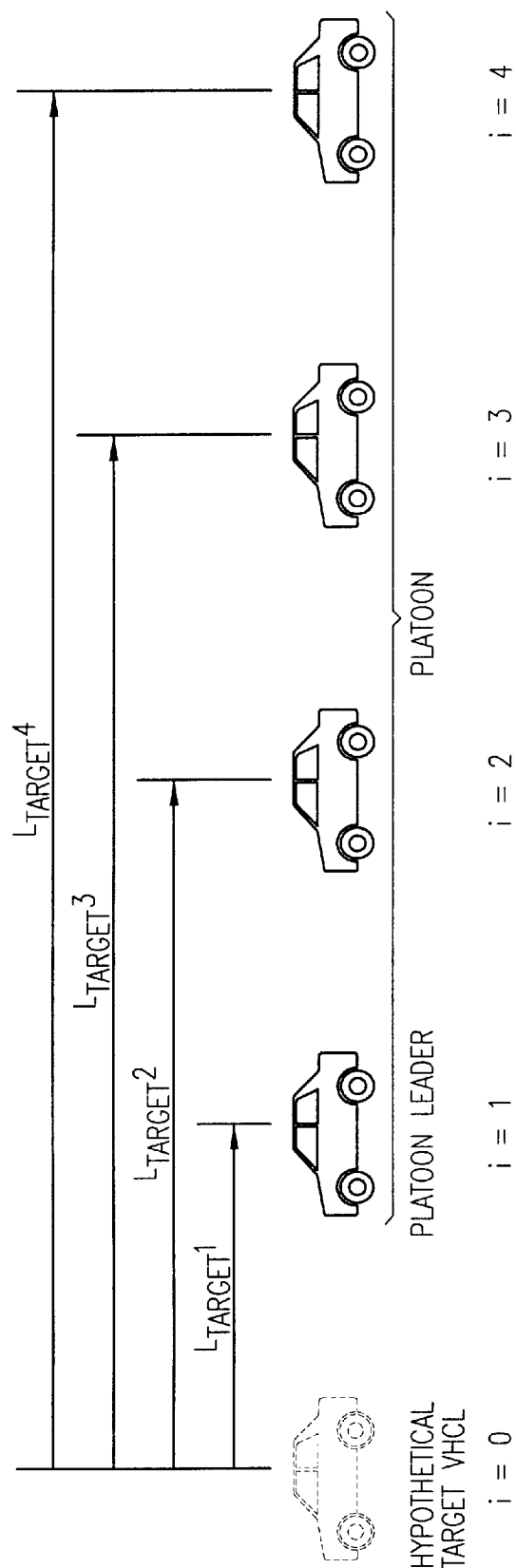
FIG. 5 is a diagram showing intervehicular distances and following positions from a hypothetical target motor vehicle ahead of a platoon of automatically driven motor vehicles.

FIG. 5 shows still another platoon of automatically driven motor vehicles each having the system arrangement shown in FIG. 1. In FIG. 5, the leading motor vehicle of the platoon establishes a hypothetical target motor vehicle, and transmits items of information of the hypothetical target motor vehicle to the other motor vehicles of the platoon which follow the platoon leader through the intervehicular communications.

A vehicle platoon control process carried by the target motor vehicle will be described below.

The control plan module 2 of the target motor vehicle has a function as a speed plan generating means for generating a speed plan which governs the relationship between the position in which the motor vehicle runs and the speed at which the motor vehicle runs on the running path B, based on speed command information in the area in which the motor vehicle is running, given from the LCX cable D through the communication module 1. The control plan module 2 produces a speed plan according to the speed command supplied from the LCX cable E. For example, when the control plan module 2 is supplied with a speed command of 80 km/h in a certain running area, if the present speed of the motor vehicle is 78 km/h, then the control plan module 2 generates a speed plan for increasing the speed of the motor vehicle up to 80 km/h at an acceleration of 2 km/h per minute, for example, and then maintaining the speed of 80 km/h.

The control plan module 2 of the target motor vehicle also has a function as a planned value determining means for determining, based on the speed plan thus generated, a planned position to be reached from the present position of the motor vehicle after a predetermined time t, e.g., 1.5 seconds, and a planned speed of the motor vehicle at the planned position. According to this function, if the speed plan from the present position of the motor vehicle is generated such that the motor vehicle is to maintain the speed of 80 km/h, i.e., 22.2 m/sec., then the planned position to be reached after the predetermined time t, e.g., 1.5 seconds, is 33.3 m spaced from the present position down the running path B, and the planned speed at the planned position to be reached is 80 km/h.

The control plan module 2 of the target motor vehicle further has functions as a predicted value calculating means, a deviation calculating means, and a longitudinal acceleration correcting quantity calculating means, as described below.

The function as the predicted value calculating means serves to determine a predicted position and a predicted speed to be reached by the motor vehicle after the predetermined time t. The predicted position is calculated from the present position, i.e., the traveled distance, the present speed, and the present acceleration of the motor vehicle which are given from the communication module 1, and the predicted speed is calculated from the present speed and the present acceleration of the motor vehicle.

The speed of the motor vehicle, based on which the predicted position and the predicted speed will be determined, is basically determined from a latest first-order differential of the position where the motor vehicle runs, which is given, from time to time, from the communication module 1, i.e., from a change in the position where the motor vehicle runs per unit time. Similarly, the acceleration of the motor vehicle is basically determined from a latest second-order differential of the position where the motor vehicle runs, i.e., from a rate of change in the speed at which the motor vehicle runs per unit time. The predicted position and the predicted speed are determined using the speed and the acceleration of the motor vehicle which are thus determined. If the motor vehicle deviates from the running path B and the position where the motor vehicle runs cannot properly be recognized, then the predicted position and the predicted speed are determined using a speed detected from a change per unit time in the traveled distance recognized from an output signal from the wheel pulse sensor 8, and an acceleration detected by the longitudinal acceleration sensor 9. The speed of the motor vehicle may be detected by a speed sensor.

The function as the deviation calculating means serves to determine a distance deviation, i.e., a position error, between a planned position to be reached by the motor vehicle after the predetermined time t based on the speed plan and the predicted position, described above, to be reached by the motor vehicle, and also determines a speed deviation, i.e., a speed error, between a planned speed to be reached by the motor vehicle after the predetermined time t based on the speed plan and the predicted speed, described above, to be reached by the motor vehicle. These deviations are calculated by subtractions.

The function as the longitudinal acceleration correcting quantity calculating means serves to generate an acceleration correcting quantity (a control quantity for correcting the longitudinal acceleration of the motor vehicle) based on the distance deviation and the speed deviation described above. In this embodiment, the longitudinal acceleration correcting quantity is generated by multiplying the distance deviation and the speed deviation by respective predetermined gain coefficients, thus producing product values, and then adding the product values to each other.

Functions of the following motor vehicle will be described below.

Figure 3:
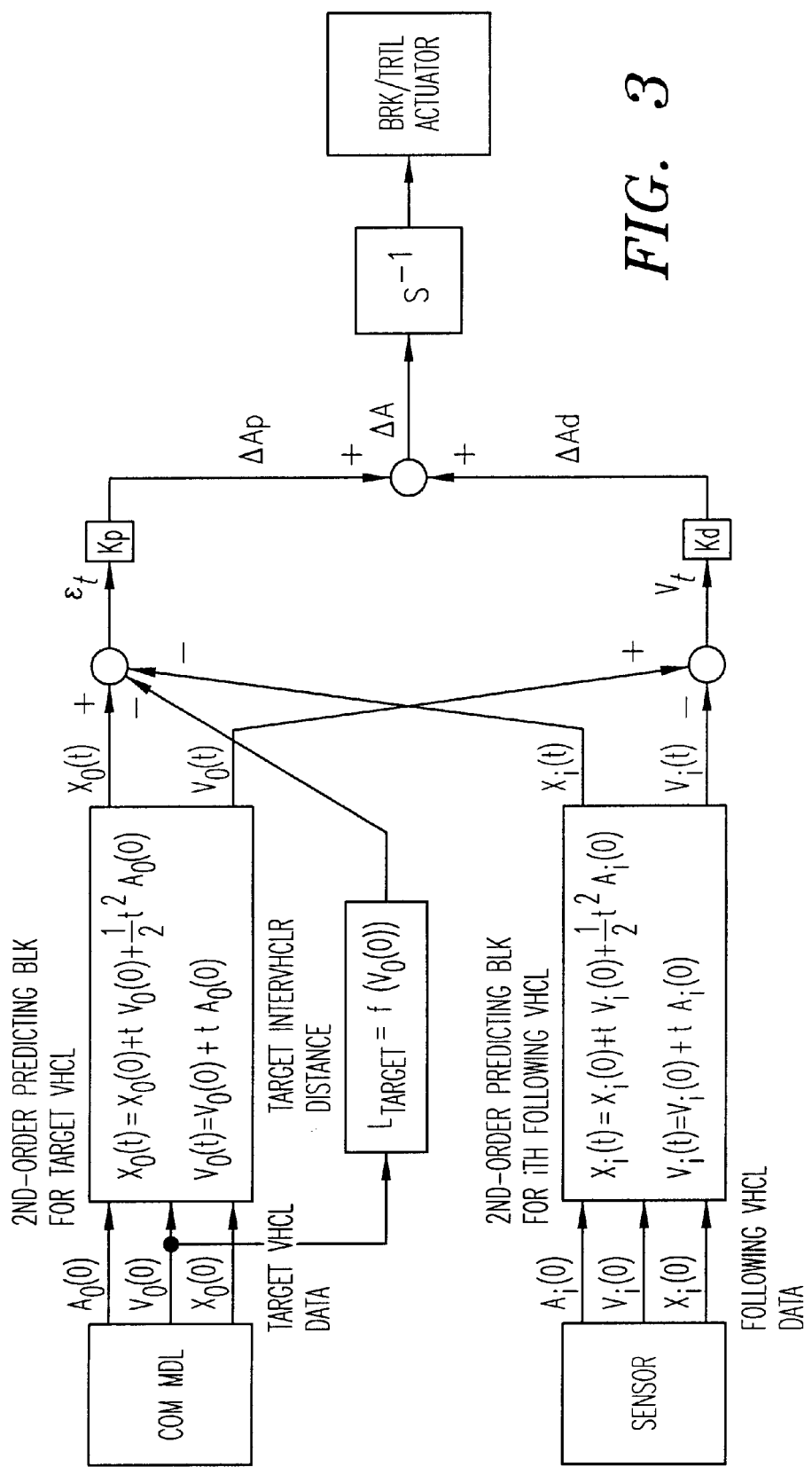
FIG. 3 is a block diagram of an algorithmic control system for controlling the speed of travel of each of the automatically driven motor vehicles shown in FIG. 1.

The control plan module 2 of the following motor vehicle has, as shown in FIG. 3, a second-order predicting block for the following motor vehicle, a second-order predicting block for the target motor vehicle, a predicted intervehicular distance calculating means for calculating a predicted intervehicular distance between the target motor vehicle and the following motor vehicle after the predetermined time t, a predicted relative speed calculating means for calculating a predicted relative speed (speed difference) between the target motor vehicle and the following motor vehicle after the predetermined time t, and a target intervehicular distance calculating means for calculating a target intervehicular distance between the target motor vehicle and the following motor vehicle.

The second-order predicting block for the following motor vehicle calculates a predicted position and a predicted speed to be reached by the following motor vehicle after the predetermined time t.

The target intervehicular distance calculating means calculates a target intervehicular distance $L_{target}i$ between the target motor vehicle and the following motor vehicle based on the position of the target motor vehicle, the speed of the target motor vehicle, and the following position i of the following motor vehicle relative to the target motor vehicle.

The second-order predicting block for the target motor vehicle calculates a predicted position and a predicted speed to be reached by the target motor vehicle after the predetermined time t. The predicted position to be reached by the target motor vehicle is calculated from the present position (traveled distance), the present speed, and the present acceleration of the target motor vehicle which are transmitted from the LCX cable E through the communication module 1 according to the intervehicular communications.

The present speed and the present acceleration of the target motor vehicle may be determined from first- and second-order differentials of the position of the target motor vehicle which is obtained from the LCX cable E through the communication module 1 according to the intervehicular communications.

The predicted intervehicular distance calculating means calculates a predicted intervehicular distance between the target motor vehicle and the following motor vehicle after the predetermined time t. Specifically, the predicted intervehicular distance calculating means calculates such a predicted intervehicular distance after the predetermined time t by determining the difference between the predicted position (calculated as described above) to be reached by the target motor vehicle and the predicted position (calculated as described above) to be reached by the following motor vehicle.

The predicted relative speed calculating means calculates a predicted relative speed or speed difference between the target motor vehicle and the following motor vehicle after the predetermined time t. Specifically, the predicted relative speed calculating means calculates such a predicted relative speed or speed difference after the predetermined time t by determining the difference between the predicted speed (calculated as described above) to be reached by the target motor vehicle and the predicted speed (calculated as described above) to be reached by the following motor vehicle.

The control plan module 2 of the following motor vehicle also has a longitudinal acceleration correcting quantity calculating means serves to generate an acceleration correcting quantity (a control quantity for correcting the longitudinal acceleration of the motor vehicle) for the following motor vehicle based on the predicted intervehicular distance and the predicted speed difference described above. In this embodiment, the longitudinal acceleration correcting quantity is generated by multiplying the predicted intervehicular distance, as adjusted by the target intervehicular distance depending on the speed of the target motor vehicle, by a gain coefficient Kp, multiplying the predicted speed difference by a gain coefficient Kd, thus producing product values, and then adding the product values to each other.

The target intervehicular distance may not vary depending on the speed of the target motor vehicle.

Common functions of the target and following motor vehicles will be described below.

The control plan module 2 of each of the target and following motor vehicles also serves to determine a present lateral positional deviation of the motor vehicle from the running path B and a directional deviation, i.e., an angle θ (see FIG. 2) formed between the motor vehicle and the running path B, based on output signals from the two magnetic sensors 6 which represent lateral positional data of the magnetic sensors 6 with respect to the running path B. The control plan module 2 also predicts a lateral positional deviation and a directional deviation of the motor vehicle from the running path B after the predetermined time t, based on the present speed and steering quantity of the motor vehicle and curvature information of the road which is given from the LCX cable E. These data are used for steering control to run the motor vehicle along the running path B.

Furthermore, the control plan module 2 on the following motor vehicle outputs, to an image display unit 18 and a sound output unit 17, various data including the speed of its own motor vehicle, the speed of the front motor vehicle, the distance up to the front motor vehicle, the configuration of the road ahead of the motor vehicle, the configuration of the lane ahead of the motor vehicle, etc.

If the motor vehicle is running as the target motor vehicle, then its control plan module 2 outputs, to the image display unit 18 and the sound output unit 17, various data including the speed of its own motor vehicle, the speed of the following motor vehicle, the distance up to the following motor vehicle, the configuration of the road ahead of the its own motor vehicle, the configuration of the lane ahead of the its own motor vehicle, etc.

In this embodiment, the predetermined time t is set to 1.5 seconds. The predetermined time t should preferably be set to a value in the range from 1 to 2 seconds.

The lateral control module 3 generates a steering angle command signal for moving the motor vehicle along the running path B based on output signals indicative of the lateral positional deviation and the directional deviation, from the control plan module 2, and outputs the steering angle command signal to control an actuator 14 in a steering operation transmitting system of the motor vehicle.

In response to the command signal, the actuator 14 then automatically steers the motor vehicle to run along the running path B, i.e., the array of magnetic information sources C.

The vehicle speed control module 4 generates an acceleration command signal based on the longitudinal acceleration correcting data generated by the control plan module 2, and outputs the acceleration command signal to control an actuator 15 in a throttle system of the motor vehicle and an actuator 16 in a brake system of the motor vehicle.

In response to the acceleration command signal, the actuators 15, 16 automatically control the throttle and brake systems of the motor vehicle to accelerate or decelerate the motor vehicle.

A brake pedal switch 13 for detecting when a brake pedal (not shown) of the motor vehicle is pressed is connected to the vehicle speed control module 4. If the brake pedal switch 13 detects when the brake pedal is pressed, then the control process of the vehicle speed control module 4 is canceled.

The vehicle speed control module 4 controls braking forces applied to the motor vehicle based on an output signal from the laser radar 10 in the event that the laser radar 10 detects an obstacle other than a front motor vehicle, for example.

A vehicle platoon control process carried out for the target and following motor vehicles in the vehicle platoon control system according to the present invention will be described below with reference to FIG. 3. In each of FIGS. 3 and 6, a control loop (feedback loop) is provided to control the motor vehicle based on output signals from the sensors which are indicative of changes in the running state of the motor vehicle caused by the actuators in the throttle and brake systems.

The control plan module 2 calculates a position $Xi(0)$ of the following motor vehicle based on detected signals from the magnetic sensors 6 through the communication module 1, a speed $Vi(0)$ (a first-order differential of the position) of the following motor vehicle from the position $Xi(0)$, and an acceleration $Ai(0)$ (a second-order differential of the position) of the following motor vehicle.

Based on the motion information of the following motor vehicle, the second-order predicting block in the control plan module 2 for the following motor vehicle calculates a predicted position Xi(t) and a predicted speed Vi(t) to be reached by the following motor vehicle after the predetermined time t according to the respective equations (1), (2) given below.

The following motor vehicle is an ith motor vehicle counted from the target motor vehicle.

$$Vi(t)=Vi(0)+Ai(0)\times t \quad (1)$$

$$Xi(t)=Xi(0)+Vi(0)\times t+Ai(0)\times t^2/2 \quad (2)$$

The second-order predicting block in the control plan module 2 for the target motor vehicle receives motion information of the target motor vehicle through the communication module 1. The received motion information includes a position Xo(0) of the target motor vehicle, a speed Vo(0) of the target motor vehicle, and an acceleration Ao(0) of the target motor vehicle.

The target motor vehicle may be a platoon leader. If, however, the target motor vehicle is not a platoon leader, then the platoon leader calculates a position Xo(0), a speed Vo(0), and an acceleration Ao(0) of the target motor vehicle using the laser radar 10 thereof.

Second-order predicted values (speed and position) of the target motor vehicle after the predetermined time t are determined according to the following equations (3) and (4):

$$Vo(t)=Vo(0)+Ao(0)\times t \quad (3)$$

$$Xo(t)=Xo(0)+Vo(0)\times t+Ao(0)\times t^2/2 \quad (4)$$

Therefore, the intervehicular distance Li(t) between the target motor vehicle and the ith following motor vehicle after the predetermined time t is expressed as follows:

$$Li(t)=Xo(t)-Xi(t) \quad (5)$$

A target intervehicular distance $L_{target}i$ between the target motor vehicle and the ith following motor vehicle is established as follows:

$$L_{target}i=Twi\times Vo(0)+Lwi\times \exp\{-K\times Vo(0)\} \quad (6)$$

where Twi is defined as Twi=Ts×i, Ts represents a time required for each following motor vehicle to run up to the position of a preceding motor vehicle, Lwi represents a minimum intervehicular distance (fixed value) between the target motor vehicle and the ith following motor vehicle, and is defined as Lwi=(CL+Lc)×i, Lc represents a minimum intervehicular distance (fixed value) for each motor vehicle, CL represents a motor vehicle length (inherent value) which varies depending on the motor vehicle type, and K is a convergent coefficient (normally ranging from 1 to 3).

If the target motor vehicle is an automatically driven motor vehicle incapable of intervehicular communications, then Twi is defined as Twi=Tsr+Ts×(i−1) where Trs represents a time established in order to provide a larger than normal intervehicular distance because of the incapability of intervehicular communications.

If a platoon comprises mixed types of motor vehicles, then it is necessary to transmit a target intervehicular distance with a vehicle length added thereto to other motor vehicles through intervehicular communications. In this case, a target intervehicular distance $L_{target}i$ is established as follows:

$$L_{target}i=Ts\times Vo(0)+Lc\times \exp\{-K\times Vo(0)\}+Lti-1+CLi-1 \quad (7)$$

where CLi−1 represents the length of the (i−1)th motor vehicle, and Lti−1 represents the target intervehicular distance calculated by the (i−1)th motor vehicle. The vehicle length CLi−1 and the target intervehicular distance Lti−1 are transmitted to a following motor vehicle through intervehicular communications.

It follows that the longitudinal acceleration of each following motor vehicle may be controlled in order to eliminate an intervehicular distance difference $\epsilon t=Li(t)-L_{target}i$ between the intervehicular distance Li(t) and the target intervehicular distance $L_{target}i$ after the predetermined time t.

Consequently, a longitudinal acceleration correcting quantity ΔAp to correct the intervehicular distance is given by:

$$\Delta Ap=Kp\times \epsilon t \quad (8)$$

If the correction coefficient Kp is $2/t^2$, then the longitudinal acceleration is kinematically corrected in order to eliminate the intervehicular distance difference after the predetermined time t. However, the longitudinal acceleration may be corrected using the correction coefficient Kp which is of a value near $2/t^2$, giving the correction coefficient Kp freedom for adjusting stability and following capability. The longitudinal acceleration correcting quantity ΔAp serves to correct the difference with the target intervehicular distance.

A process of determining a longitudinal acceleration correcting quantity in view of the difference between relative speeds between the target motor vehicle and following motor vehicles will be described below.

From the equations (1), (3), a vehicle speed difference Vt between the target motor vehicle and the ith following motor vehicle after the predetermined time t is expressed by the following equation (9):

$$Vt=Vo(t)-Vi(t) \quad (9)$$

Therefore, the longitudinal acceleration of each following motor vehicle may be corrected in order to converge the vehicle speed difference Vt to zero. A longitudinal acceleration correcting quantity ΔAd is given by:

$$\Delta Ad=Kd\times Vt \quad (10)$$

If the correction coefficient Kd is 1/t, then the longitudinal acceleration is kinematically corrected in order to eliminate the intervehicular distance difference after the predetermined time t. However, the longitudinal acceleration may be corrected using the correction coefficient Kp which is of a value near 1/t, giving the correction coefficient Kd freedom for adjusting stability and following capability.

Since a longitudinal acceleration correcting quantity ΔA of each following moor vehicle in view of both the intervehicular distance difference and the vehicle speed difference is equal to the sum of the equations (8) and (10), the longitudinal acceleration correcting quantity ΔA is given as follows:

$$\Delta A=\Delta Ap+\Delta Ad=Kp\times \epsilon t+Kd\times Vt \quad (11)$$

Actually, as shown in FIG. 3, the longitudinal acceleration correcting quantity ΔA determined according to the equation (11) is added to the present longitudinal acceleration of each following motor vehicle according to an integral control process.

Based on the above control algorithm, the engine throttle valve opening, the transmission, and the brake of each of plural following motor vehicles are controlled to control the motor vehicles in platoon.

A control algorithm for controlling a vehicle platoon in view of not only the intervehicular distance between a target motor vehicle and a following motor vehicle, but also the intervehicular distance between a preceding motor vehicle running immediately in front of the following motor vehicle and the following motor vehicle, will be described below with reference to FIGS. 6, 7(*a*), and 7(*b*). FIG. 7(*a*) shows such a vehicle platoon.

Those portions shown in FIG. 6 which are identical to those shown in FIG. 3 will not be described below. In FIG. 6, a control loop (feedback loop) is provided to exponentially increase a gain to exponentially increase the intervehicular distance between the preceding motor vehicle and the following motor vehicle as the intervehicular distance approaches a predetermined minimum intervehicular distance, in addition to the control loop (feedback loop) for controlling the following motor vehicle to follow the target motor vehicle.

Figure 6:
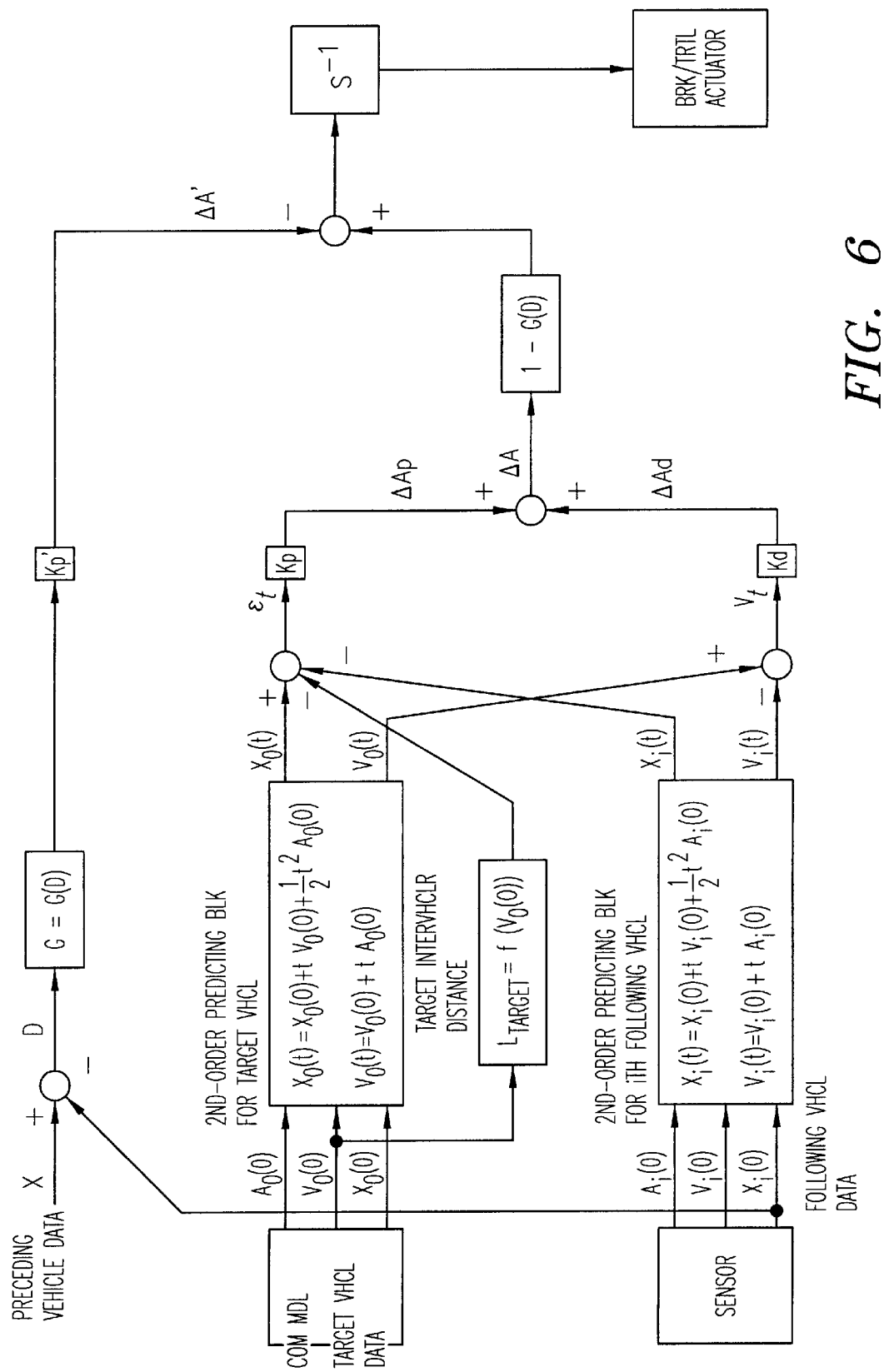
FIG. 6 is a block diagram of an algorithmic control system for controlling the speed of travel of an automatically driven motor vehicle which follows a target motor vehicle.
Figure 7A:
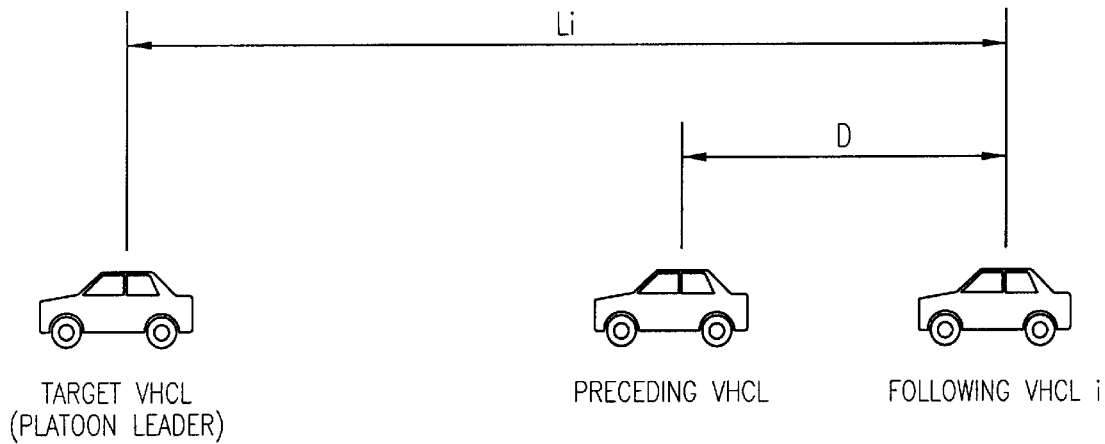
FIGS. 7(a) and 7(b) are diagrams illustrative of the manner in which a motor vehicle is controlled on the basis of an intervehicular distance between itself and a preceding motor vehicle.
Figure 7B:
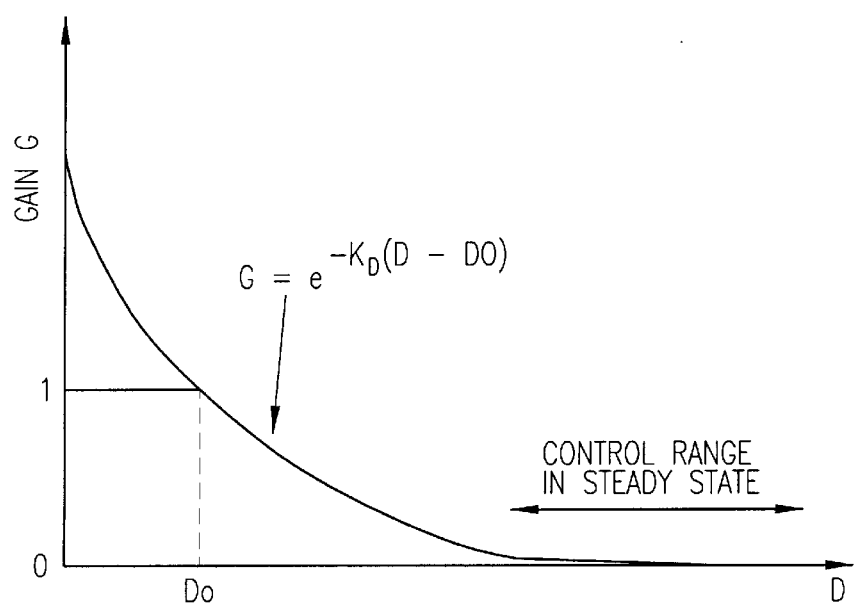

The algorithmic control system shown in FIG. 6 detects the positional data of the preceding motor vehicle through intervehicular communications or the laser radar, and controls the following motor vehicle in the event that the preceding motor vehicle drops out of a normal control range of the vehicle platoon control. If it is assumed that the intervehicular distance between the preceding motor vehicle and the following motor vehicle is represented by D, a predetermined minimum intervehicular distance by Do, and an adjusting coefficient by $K_D$, then a nonlinear control gain G(D) is calculated as follows:

$$G(D) = \exp\{-K_D \times (D-Do)\} \quad (12)$$

As shown in FIG. 7(*b*), the nonlinear control gain G(D) is established such that the actual intervehicular distance D exponentially increases as it approaches the predetermined minimum intervehicular distance Do. Specifically, the following motor vehicle is controlled to increase the intervehicular distance between the preceding motor vehicle and the following motor vehicle when the intervehicular distance up to the preceding motor vehicle approaches the predetermined minimum intervehicular distance Do.

Using a gain correcting coefficient Kp' for correcting the nonlinear control gain G(D), a longitudinal acceleration correcting quantity ΔA' is calculated as follows:

$$\Delta A' = (1 - G(D)) \times \Delta A - Kp' \times G(D) \quad (13)$$

where the value of (1−G(D)) is determined in advance such that it is set to zero when it becomes negative in order to prevent the following motor vehicle from being abruptly decelerated. The gain correcting coefficient Kp' may have a value of about 1, or a value of about 0.5 or 2 to match the adjusting coefficient $K_D$.

Even when a motor vehicle drops out of the normal range of the vehicle platoon control, the control algorithm shown in FIG. 6 controls a following motor vehicle to increase its intervehicular distance up to such a motor vehicle. Therefore, the vehicle platoon control will not be interrupted even when one or more motor vehicles drops out of the platoon.

When the motor vehicle which has dropped out of the platoon recovers and becomes normally controlled, since the nonlinear control gain G(D) has a value close to zero as shown in FIG. 7(*b*), the following motor vehicle automatically regains the normal intervehicular distance, without adversely affecting the intervehicular distances in the overall vehicle platoon.

It was confirmed from actual experimentation that the above advantages were fully obtained by setting the minimum intervehicular distance Do to 2~3 m and the adjusting coefficient $K_D$ to about 1.

A process of allowing a plurality of following motor vehicles which are running in platoon to recognize their position (i) as counted from a target motor vehicle will be described below.

If it is known that a group of motor vehicles will travel in platoon or motor vehicles are counted at a tollgate or the like and the incremental count is indicated to each motor vehicle to let it recognize its position in the platoon, then it is possible to establish the position i for each of the motor vehicles before they travel in platoon.

However, in order to handle a situation where another motor vehicle pulls in between motor vehicles running in platoon or another motor vehicle is added to a front or rear end of a platoon of motor vehicles, the process according to the present invention makes it possible for each of the motor vehicles running in platoon to recognize its position relative to a target motor vehicle through intervehicular communications.

There are two procedures available for each of the motor vehicles running in platoon to recognize its position relative to a target motor vehicle.

Figure 8:
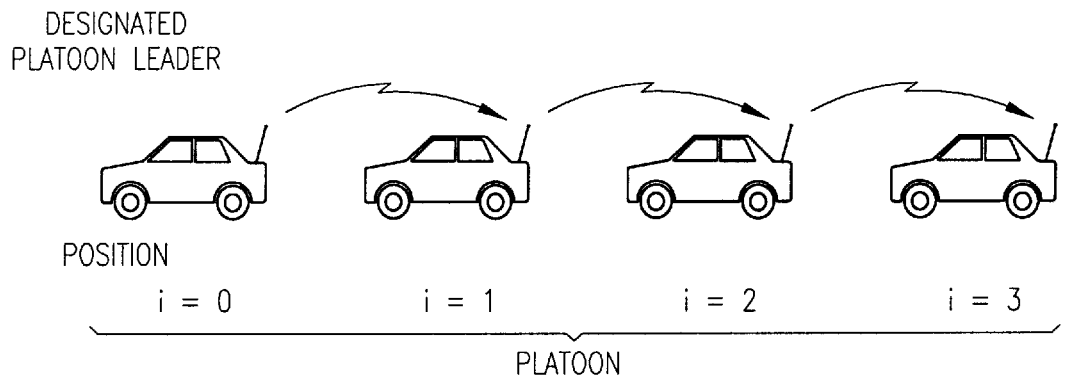
FIG. 8 is a diagram illustrative of the manner in which each of motor vehicles in a platoon recognizes its position in the platoon.

The first procedure is applicable to local intervehicular communications by which each of the motor vehicles of the platoon can communicate with only those motor vehicles which run immediately in front of and behind the motor vehicle. The first procedure will be described below with reference to FIG. 8.

If the platoon leader of a platoon is selected as a target motor vehicle, then the target motor vehicle transmits its own positional information i=0 to a next motor vehicle which immediately follows the target motor vehicle.

The following motor vehicle adds 1 to i, producing its own positional information i=1, recognizes that it is the second motor vehicle from the target motor vehicle, and transmits its own positional information i=1 to a next motor vehicle which immediately follows the second motor vehicle.

Having received the positional information i=1, the next immediately following motor vehicle adds 1 to i, producing its own positional information i=2, recognizes that it is the third motor vehicle from the target motor vehicle, and transmits its own positional information i=2 to a next motor vehicle which immediately follows the third motor vehicle.

In this manner, each of the motor vehicles is able to recognize its position relative to the target motor vehicle with a means for counting its position and local intervehicular communications.

If a target motor vehicle is not the platoon leader of a platoon and the target motor vehicle and the platoon leader cannot communicate with each other through intervehicular communications, then the platoon leader sets its own positional information to i=1, and transmits the own positional information i=1 to a next motor vehicle which immediately follows the target motor vehicle.

The second procedure is applicable to broadcasting intervehicular communications by which each of the motor vehicles of the platoon can communicate with a plurality of motor vehicles, not just those motor vehicles which run immediately in front of and behind the motor vehicle. The second procedure will be described below with reference to FIGS. 9, 10(*a*), and 10(*b*). The broadcasting intervehicular communications may be carried out according to a frequency-division multiplex process or a time-division multiplex process.

Figure 9:
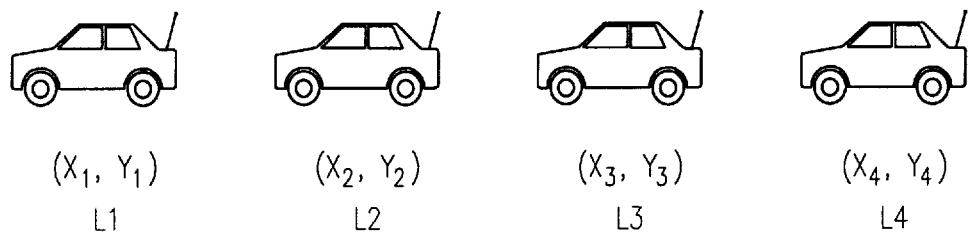
FIG. 9 is a diagram illustrative of the manner in which each of motor vehicles in a platoon recognizes its position in the platoon.
Figures 10A, 10B:
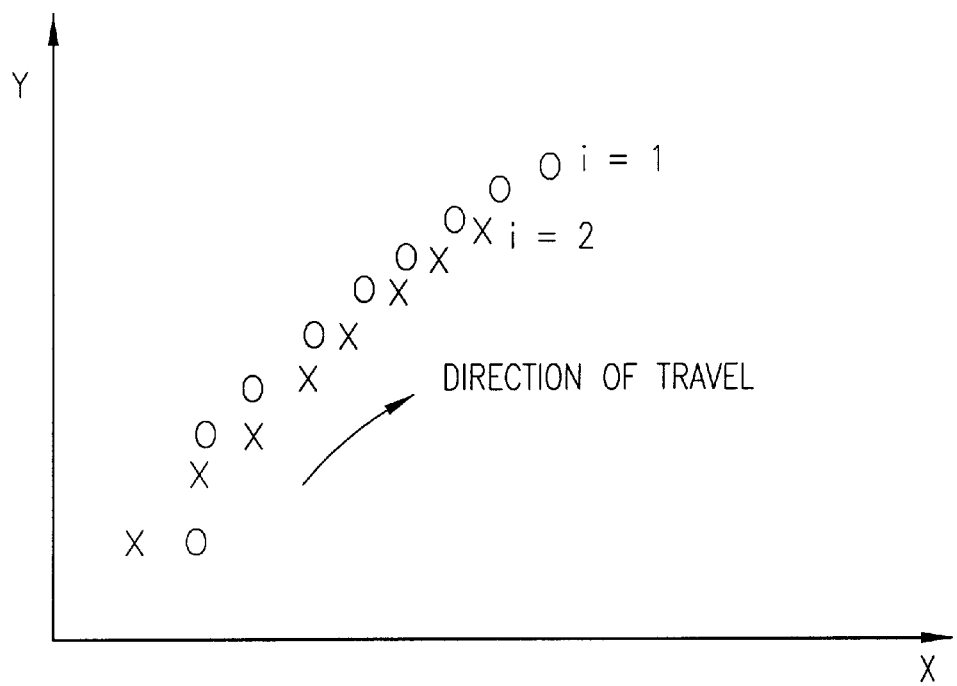
FIGS. 10(a) and 10(b) are diagrams illustrative of the manner in which each of motor vehicles in a platoon recognizes its position in the platoon.

As shown in FIG. 9, the motor vehicles of a platoon recognize their respective positions $(X_1, Y_1)$, $(X_2, Y_2)$, $(X_3, Y_3)$, $(X_4, Y_4)$ or respective distances $L_1, L_2, L_3, L_4$ from a starting point based on detected signals from the magnetic information sources C. Each of the motor vehicles transmits its recognized position or distance to other motor vehicles through the broadcasting intervehicular communications, as shown in FIG. 10(a). Having received the signals transmitted from the other motor vehicles of the platoon, each of the motor vehicles rearranges the received signals based on the positions (X, Y) or distances (L), and recognizes its own position with respect to a target motor vehicle.

As shown in FIG. 10(b), when each of the motor vehicles receives the signals transmitted from the other motor vehicles of the platoon, it calculates paths of travel of the other motor vehicles from changes in their positions (X, Y) represented by the received signals, and recognizes its own position with respect to a target motor vehicle from the direction of travel which is represented by the calculated paths of travel.

The positions (X, Y) of the motor vehicles may be plotted on a two-dimensional coordinate system on a map based on navigation information, and each of the motor vehicles may recognize its position with respect to a target motor vehicle by counting the plotted positions along the direction of travel.

According to the present invention, as described above, a longitudinal acceleration correcting quantity of each of the motor vehicles of a platoon is determined on the basis of predicted deviations of a position and a speed that are predicted after a predetermined time, from a speed plan, and the speed of the motor vehicle is controlled on the basis of the determined longitudinal acceleration correcting quantity. Therefore, the motor vehicles can smoothly be controlled to run in platoon along a running path on a road.

A longitudinal acceleration correcting quantity of a motor vehicle following a target motor vehicle is determined on the basis of an intervehicular distance between the following motor vehicle and the target motor vehicle and a speed difference therebetween after a predetermined time, and the speed of the following motor vehicle is controlled on the basis of the determined longitudinal acceleration correcting quantity. Consequently, the following motor vehicle can automatically be driven smoothly along a running path on a road while reliably keeping a proper intervehicular distance between the following motor vehicle and the target motor vehicle.

Since the system arrangements on a platoon leader and a following motor vehicle of a platoon are identical to each other, the platoon leader and the following motor vehicle can automatically be driven in a manner to match them using slightly different software or program adaptations made therefor. Therefore, any one of the motor vehicles of the platoon may become a platoon reader or a following motor vehicle.

Each of following motor vehicles of a platoon is not only controlled with respect to a platoon leader, but also always monitors an intervehicular distance between itself and a preceding motor vehicle, so that it can increase the intervehicular distance even when a motor vehicle drops out of the platoon. Therefore, it is not necessary to stop controlling the vehicle platoon control when a motor vehicle drops out of the platoon.

In the illustrated embodiment, each of the motor vehicles has the wheel pulse sensor 8, the longitudinal acceleration sensor 9, and the laser radar 10 which are provided against a failure to detect the magnetic information sources C. However, the wheel pulse sensor 8, the longitudinal acceleration sensor 9, and the laser radar 10 may be dispensed with, and the position (traveled distance) of the motor vehicle may be recognized by the number of detected magnetic information sources C, and the speed and acceleration of the motor vehicle may be determined from first- and second-order differentials of the recognized position.

The information sources on the running path B are not limited to the magnetic information sources C, but may comprise colored or graphic marks arrayed on the running path B which may be optically detected. These marks may be spaced at intervals other than 500 m.

Alternatively, no information sources may be provided on the running path B, but the positions of the motor vehicles of a platoon may be calculated on the basis of navigation information from a global positioning system (GPS) or the like, and the motor vehicles may be controlled in platoon on the basis of the calculated positions.

While the LCX cable E is employed as the information providing facility in the illustrated embodiment, a cellular radio communication facility or beacons may be used as the information providing facility.

The vehicle platoon control system according to the present invention is effective to prevent intervehicular distances between motor vehicles of a platoon from being oscillated, i.e., locally disturbed, and also to improve controllability of motor vehicles near the rear end of the platoon.

Furthermore, the motor vehicles can continuously be controlled to run in platoon even when another vehicle cuts in, the platoon is broken up, or other motor vehicles join the platoon.

The vehicle platoon control system allows a platoon leader and a following motor vehicle of a platoon to switch around without any substantial system program modification, and can establish a hypothetical motor vehicle and transmit motion information of the hypothetical motor vehicle to following motor vehicles to continuously control the motor vehicles to run in platoon.

Even when a motor vehicle drops out of a platoon, the vehicle platoon control system does not stop controlling the other motor vehicles to run in platoon, and when the motor vehicle that has dropped out returns to the platoon, the vehicle platoon control system can continuously control the motor vehicles to run in platoon.

The vehicle platoon control system allows different types of motor vehicles, such as trucks of different lengths, smaller automobiles, larger automobiles, etc., to be mixed in a platoon, and can control those motor vehicles to run in platoon.

Accordingly, the vehicle platoon control system according to the present invention is capable of stably controlling motor vehicles to run in platoon on a road designed for motor vehicles to run automatically, and particularly of controlling the speeds of such motor vehicles smoothly.

Although a certain preferred embodiment of the present invention has been shown and described in detail, it should be understood that various changes and modifications may be made therein without departing from the scope of the appended claims.

What is claimed is:

1. A vehicle platoon control system for controlling a platoon of motor vehicles, comprising:

means for establishing a target motor vehicle for leading the platoon of motor vehicles;

means for transmitting motion information including a position and a speed of the target motor vehicle to the motor vehicles which follow the target motor vehicle; and controlling means on each of the following motor vehicles, wherein the controlling means on a given motor vehicle selected from the following motor vehicles comprises a first control loop for controlling the given motor vehicle to follow the target vehicle, and a second control loop having a gain which is nonlinearly variable with respect to the intervehicular distance between the given motor vehicle and a motor vehicle within the platoon preceding the given motor vehicle.

2. The vehicle platoon control system of claim 1, wherein the gain of the second control loop exponentially increases to exponentially increase the intervehicular distance if the intervehicular distance approaches a predetermined minimum intervehicular distance.

3. The vehicle platoon control system of claim 1, wherein the controlling means on the given motor vehicle further comprises means for transmitting a target intervehicular distance from the target motor vehicle and a length of the given motor vehicle to a motor vehicle within the platoon following the given vehicle.

4. A vehicle platoon control system for controlling a platoon of motor vehicles, comprising:

means for establishing a hypothetical target motor vehicle for leading the platoon of motor vehicles;

means for transmitting motion information of the hypothetical motor vehicle to the motor vehicles which follow the hypothetical target motor vehicle; and controlling means on each of the following motor vehicles, wherein the controlling means on a given motor vehicle selected from the following motor vehicles comprises a first control loop for controlling the given motor vehicle to follow the hypothetical target vehicle, and a second control loop having a gain which is nonlinearly variable with respect to the intervehicular distance between the given motor vehicle and a motor vehicle within the platoon preceding the given motor vehicle.

5. The vehicle platoon control system of claim 4, wherein the gain of the second control loop exponentially increases to exponentially increase the intervehicular distance if the intervehicular distance approaches a predetermined minimum intervehicular distance.

6. The vehicle platoon control system of claim 5, wherein the controlling means on the given motor vehicle further comprises means for transmitting a target intervehicular distance from the hypothetical target motor vehicle and a length of the given motor vehicle to a motor vehicle within the platoon following the given vehicle.

\* \* \* \* \*